United States Patent [19]
Lee

[11] Patent Number: 5,545,471
[45] Date of Patent: Aug. 13, 1996

[54] ELECTROCONDUCTIVE ADHESIVE TAPE

[76] Inventor: Yong I. Lee, 188-3, Seocho-Dong, Seocho-Ku, Seoul, Rep. of Korea

[21] Appl. No.: 517,726

[22] Filed: Aug. 21, 1995

Related U.S. Application Data

[63] Continuation-in-part of Ser. No. 111,607, Aug. 25, 1993, abandoned.

[51] Int. Cl.$^6$ ........................................................ B32B 7/00
[52] U.S. Cl. ........................... 428/251; 428/252; 428/259; 428/354
[58] Field of Search ................................... 428/251, 259, 428/252, 354

[56] References Cited

U.S. PATENT DOCUMENTS 3,590,570  7/1971  Okuhashi et al. .......................... 57/140

*Primary Examiner*—Christopher W. Raimund
*Attorney, Agent, or Firm*—Harrison & Egbert

[57] ABSTRACT

An improved electroconductive adhesive tape used for fixing an explosion protective band to a Braun tube is disclosed. This tape has a base, a non-adhesive thermoplastic resin layer and an adhesive layer. The base uses woven fabrics having a network structure. In the above woven fabrics, glass fibers twisted with at least one piece of electroconductive fine fiber are used as warps, while either cotton yarns or blended spurn yarns made of cotton and polyester are used as wefts. The thermoplastic resin layer and adhesive layer are applied on both sides of the base. The electroconductive adhesive tape of this invention not only prevents the static electricity from accumulating in a Braun tube, but also improves the adhesive strength between the base and a thermoplastic resin layer such as a polyethylene layer.

3 Claims, 2 Drawing Sheets

ELECTROCONDUCTIVE ADHESIVE TAPE

RELATED APPLICATIONS

The present application is a continuation-in-part application of U.S. patent application Ser. No. 08/111,607, filed on Aug. 25, 1993, and entitled "AN ELECTROCONDUCTIVE ADHESIVE TAPE", abandoned.

BACKGROUND OF THE INVENTION

1. Field of the Invention

The present invention relates in general to electroconductive adhesive tapes used for fixing an explosion protective band to a Braun tube and, more particularly, to a structural improvement in such tapes for not only improving the adhesive strength between the base of an electroconductive adhesive tape and a thermoplastic resin layer such as a polyethylene layer, but also preventing the static electricity from accumulating in the Braun tube.

2. Description of the Prior Art

Since a Braun tube is conventionally made of glass and in a vacuum condition in its interior, the Braun tube may be easily damaged by an outside impact. In order to prevent the outside impact from being directly applied to the Braun tube itself, the Braun tube is not directly fixed to a housing (or a casing) of a television set but indirectly fixed to the housing by means of an explosion protective band. This explosion protective band is made of a metal and attached to the outer edge of the Braun tube. The explosion protective band absorbs the outside impact and thereby prevents the Braun tube from being suddenly damaged by the impact. As the explosion protective band is attached to the edge of the Braun tube, the fragments of the Braun tube may be merely scattered for a short distance when the Braun tube suddenly explodes by a very powerful outside impact. The explosion protective band also effectively discharges the static electricity of the Braun tube to the outside and thereby prevents the static electricity from accumulating in the Braun tube.

When the explosion protective band is mounted to the outer edge of the Braun tube, an adhesive tape is used.

The Braun tube of an image receiving apparatus such as a television set or a video display terminal is applied with a high voltage in its interior when an image is produced on the screen of the Braun tube. Due to the above high voltage, static electricity is generated on the outer surface of the Braun tube. The static electricity must be removed from the Braun tube; otherwise the static electricity will accumulate on the outer surface of the Braun tube and cause several problems as follows.

Since the Braun tubes have various uses, a user has many opportunities to touch with the Braun tube by the hand or body. The static electricity accumulating in the Braun tube exerts a bad effect on the user's body as well as on the operational performance of the Braun tube. For example, when a user is brought into contact with the Braun tube charged with the static electricity, the user may be susceptible to disease and also may feel discomfort. In addition, the static electricity may disturb the electric circuit of the apparatus. The static electricity may also shake the image produced on the screen of the Braun tube.

Recently, many attempts have been made to prevent the static electricity from accumulating in the Braun tube. For example, an electroconductive adhesive tape, which was prepared by coating an electroconductive material, such as graphite, on an aluminum or copper foil, is cut into several pieces having a predetermined length. The tape pieces in turn are attached to the outer edge of Braun tube at regular intervals. Thereafter, an explosion protective band is attached to the adhesive tape pieces such that band and tape pieces are electrically connected to each other. With the electroconductive adhesive tape and the explosion protective band attached to the Braun tube, the static electricity generated from the Braun tube can be discharged to the outside through the tape and band and in turn through a grounding circuit provided in the housing.

A high precision image receiving apparatus, such as a computer monitor, a large-sized color television set or a high definition television set, uses a color display tube (CDT). In order to remove the static electricity and to block electromagnetic waves emitted from the screen of the CDT, such a CDT may be coated with electroconductive ceramics.

However, the conventional electroconductive adhesive tape used for fixing the explosion protective band to the Braun tube has a problem as follows. That is, the base of the conventional adhesive tape is formed of woven fabrics with a network structure into which glass fibers are woven. The above woven fabrics with network structure used as the conventional tape's base are noted to have a high tensile strength. However, since one side of the above woven fabrics of the tape's base has no adhesive strength with a thermoplastic synthetic resin layer such as a polyethylene layer, the above tape's base must be additionally treated to improve its adhesive strength when the tape is used for fixing the explosion protective band to the Braun tube.

SUMMARY OF THE INVENTION

It is, therefore, an object of the present invention to provide an electroconductive adhesive tape in which the above problems can be overcome and which not only improves the adhesive strength between the base of the tape and a thermoplastic resin layer such as a polyethylene layer, but also prevents the static electricity from accumulating in a Braun tube. The base of this tape is formed of woven fabrics having a network structure. In order to weave the above fabrics used as the base, glass fibers twisted with at least one piece electroconductive fine fiber are used as the warps with relatively high tensile strength, while either cotton yarns or blended spurn yarns made of cotton and polyester are used as the wefts with relatively lower tensile strength.

When the base of the electroconductive adhesive tape of this invention is formed of woven fabrics with network structure having the aforementioned warps and wefts, the tape not only improves the adhesive strength between the base of the tape and a thermoplastic resin layer, but also cuts down the cost.

When fixing an explosion protective band to a Braun tube using the above tape, the electroconductive fine fibers twisted with the glass fibers of the warps are brought into partial close contact with an electroconductive ceramic coating layer of the Braun tube, thereby forming a plurality of electroconductive contact points between the tape and the Braun tube. Due to the above electroconductive contact points, the static electricity generated from the Braun tube easily flows into the explosion protective band through the electroconductive adhesive tape and in turn is discharged to the outside. Therefore, the electroconductive adhesive tape of this invention prevents the static electricity from accumulating in the Braun tube.

Either the cotton yarns or the blended spurn yarns made of cotton and polyester are easily twisted. The electroconductive adhesive tape, whose base is formed of the woven fabrics with network structure comprising the twisted cotton yarns or blended spurn yarns, bears the hot temperature of the explosion protective band when the heated band is fixed to the Braun tube by using the tape. Therefore, the electroconductive adhesive tape has the same strength as that of a conventional tape whose base is formed of woven fabrics exclusively comprising the glass fibers.

BRIEF DESCRIPTION OF THE DRAWINGS

The above and other objects, features and other advantages of the present invention will be more clearly understood from the following detailed description taken in conjunction with the accompanying drawings, in which:

FIGS. 3A to 3C are sectional views taken along the line parallel to a weft of the tape's base of this invention, showing the structure of the electroconductive adhesive tape after attaching the heated explosion protective band to the tape, in which:

FIG. 3A is an enlarged sectional view showing an electroconductive contact point formed between the explosion protective band and the tape;

FIG. 3B is a sectional view showing the structure of the tape after attaching the heated explosion protective band to the tape; and FIG. 3C is an enlarged sectional view showing an electroconductive contact point formed between the Braun tube and the tape.

DESCRIPTION OF THE PREFERRED EMBODIMENTS

Figure 1:
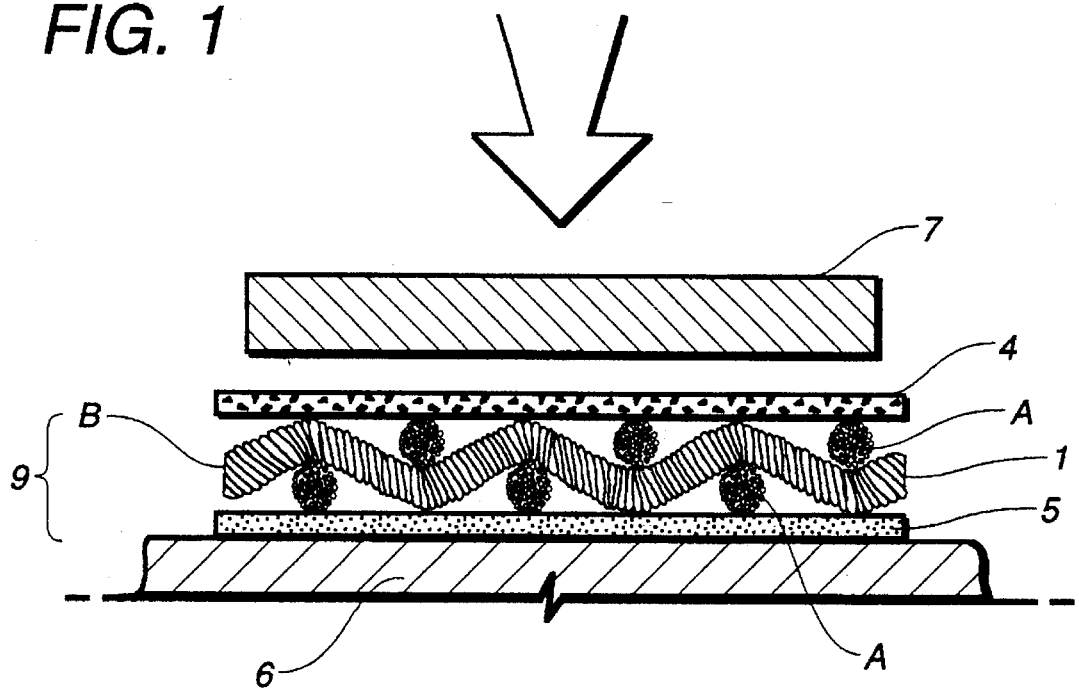
FIG. 1 is a sectional view taken along a line parallel to a weft of a tape's base of this invention, showing the electroconductive adhesive tape of this invention attached to the outer surface of a Braun tube prior to attaching a heated explosion protective band to the tape.
Figure 2:
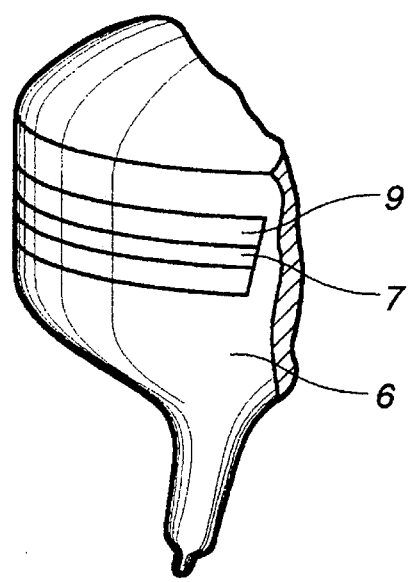
FIG. 2 is a perspective view showing the explosion protective band fixed to the Braun tube using the electroconductive adhesive tape of this invention.

The base of an electroconductive adhesive tape according to this invention is formed of woven fabrics with network structure. As shown in FIGS. 1 to 3, warps A and wefts B are woven into the woven fabrics used as the tape's base 1. Each warp A comprises glass fibers 2a twisted with at least one piece of electroconductive fine fiber 3, while each weft B comprises cotton yarns 2b or blended spurn yarns made of cotton and polyester. In order to prepare the above base 1, at least one piece of electroconductive fine fiber 3 having a diameter of 25–75 μm is twisted with the warp A. The electroconductive fine fiber 3 used in the present invention is selected from the group of aluminum fiber, iron fiber, copper fiber and carbon fiber.

The both sides of the above base 1 are applied with an adhesive layer 5 and a non-adhesive thermoplastic resin layer 4 respectively in a conventional manner, thus producing the electroconductive adhesive tape 9 of this invention as shown in FIG. 1.

The adhesive layer 5 applied on one side of the base 1 is formed of either acrylic adhesive, having the ingredient of acrylic ester, or rubber adhesive having the ingredient of natural rubber.

In order to prepare the above acrylic adhesive, 50 weight part of butyl acrylate monomer, 30 weight part of ethyl acrylate monomer and 10 weight part of ethylhexyl acrylate monomer are added to 100 weight part of solvent mixture comprising 10 w % of methyl ethyl ketone, 70 w % of toluene and 20 w % of ethyl acetate, thereby being dissolved in the solvent mixture. Thereafter, the resulting mixture is added with about 2 weight part of benzoyl peroxide and heated to be polymerized, thereby preparing the desired acrylic adhesive.

Meanwhile, the rubber adhesive is prepared by hot-mixing of 50 weight part of natural rubber, 50 weight part of rosin ester, 5 weight part of zinc oxide (ZnO) and 3 weight part of polybutene with a solvent mixture comprising 200 weight part of toluene and 100 weight part of normal hexane.

The thermoplastic resin layer 4 is formed of a polyethylene film.

As shown in FIG. 1, the above electroconductive adhesive tape 9 is applied on the Braun tube 6. Thereafter, an explosion protective band 7 heated to about 380° to 450 °C. is attached to the tape 9. The heat of the hot band 7 makes the above two layers 4 and 5 to melt and infiltrate into the woven structure of base 1 as will be described below. The heated explosion protective band 7 is gradually cooled and shrunk while melting the layers 4 and 5 using its heat. At this time, the adhesive tape 9 is welded to both the band 7 and Braun tube 6 at the same time of infiltration of both the melted adhesive of the layer 5 and the melted thermoplastic of the layer 4 into the woven structure of the warps A and wefts B. The base 1 is shrunk together with both the thermoplastic material and adhesive of the layers 4 and 5 infiltrated into the base 1.

Figure 3A:
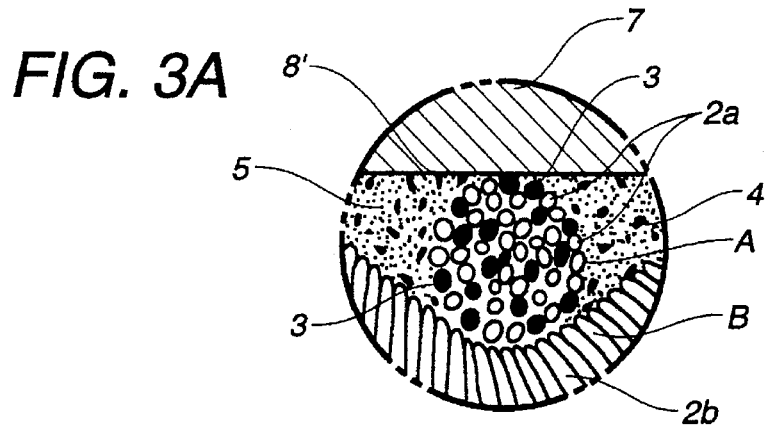
Figure 3B:
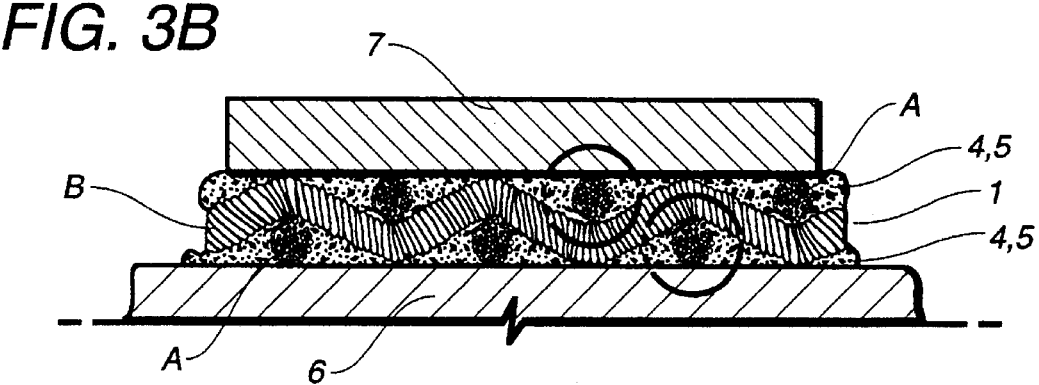
Figure 3C:
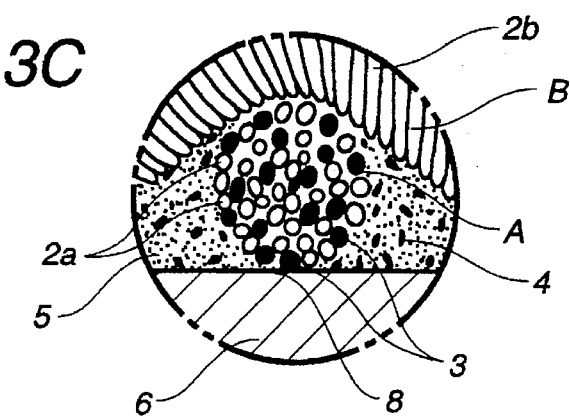

As the layers 4 and 5 are melted and in turn infiltrated into the structure of the base 1 as described above, the base 1 is brought into direct contact with both the Braun tube 6 and the explosion protective band 7, thereby forming electroconductive contact points 8 and 8' as shown in FIGS. 3A to 3C. The contact points 8 are formed between the electroconductive fine fiber 3 of the base 1 and the Braun tube 6, while the contact points 8' are formed between the fiber 3 and the band 7. Due to the above contact points 8 and 8', the static electricity generated from the Braun tube 6 flows into the explosion protective band 7 through the adhesive tape 9. Therefore, it is possible to prevent the static electricity from accumulating in the Braun tube 6. The electroconductive adhesive tape 9 of this invention has about $4.7 \times 10^{-3}$ to $6.8 \times 10^{-3}$ Ωm of electric resistance value. In addition, the product using the electroconductive adhesive tape 9 of this invention shows a satisfactory level of static electricity accumulating in the Braun tube 6. The electroconductive fine fiber 3 of the base 1 is brought into contact with both the Braun tube 6 at the contact points 8 and the explosion protective band 7 at the contact points 8'.

The electroconductive adhesive tape 9 of this invention cuts down the production cost, keeps the Braun tube safe and prevents the static electricity from accumulating in the Braun tube.

As described above, the electroconductive fine fiber is twisted with either glass fibers, cotton fibers or blended spurn yarns made of cotton and polyester and used for removing the static electricity accumulating in the Braun tube according to this invention. The above electroconductive fine fiber protects the Braun tube more effectively than conventional electroconductive metallic particles. A collateral advantage of this invention resides in the fact that the tape's base becomes stronger as it is formed of woven fabrics into which glass fibers twisted with at least one piece of electroconductive metallic fiber is woven.

The glass fiber used as the warp according to the present invention may be coated with an electroconductive material such as graphite, copper powder and iron powder. In this case, the glass fiber is provided with electroconductivity.

In accordance with this invention, the electroconductive fine fiber is exclusively twisted with the warp of the base. Therefore, the number of electroconductive contact points between the electroconductive fine fiber and both the Braun tube and the explosion protective band can be controlled such that a predetermined number of contact points are regularly distributed in a unit area.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An electroconductive adhesive tape used for fixing an explosion protective band to a Braun tube comprising:

a base formed of woven fabrics having a network structure, said woven fabrics comprising a glass fiber twisted with at least one piece of electroconductive fine fiber as a warp and a cotton yarn as a weft;

a non-adhesive thermoplastic resin layer applied on one side of said base; and an adhesive layer applied on another side of the base.

2. The electroconductive adhesive tape according to claim 1, wherein said weft is a material selected from the group consisting of a cotton yarn and a blended spun yarn of cotton and polyester.

3. The electroconductive adhesive tape according to claim 1, wherein said electroconductive fine fiber is a fiber selected from the group consisting of an aluminum fiber, a copper fiber, an iron fiber and a carbon fiber.

* * * * *